United States Patent Office 2,960,552
Patented Nov. 15, 1960

2,960,552
POLYMERIZATION OF PROPYLENE

William L. Wasley, Santa Ana, Calif., assignor to Union Oil Company of California, Los Angeles, Calif., a corporation of California No Drawing. Filed June 10, 1957, Ser. No. 664,508

7 Claims. (Cl. 260—683.15)

This invention relates to methods for polymerizing propylene to obtain viscous oils of good lubricating quality, in the 300–800 molecular weight range ($C_{20}$–$C_{60}$). The process consists essentially in treating propylene in the liquid phase at low temperatures with dry boron trifluoride in the presence of a small amount of a preformed, dissolved, high-molecular-weight olefin polymer. The preformed polymer apparently acts as a "seed"; in its absence, little or no polymer is formed under the conditions required for obtaining polypropylene of the desired molecular weight.

It is known that boron trifluoride will catalyze the polymerization of olefins in varying degrees, depending upon the conditions of temperature and pressure, and the particular olefin used. At room temperature, liquid isobutylene gives mainly dimers and trimers, and essentially no polymers in the $C_{20}$–$C_{60}$ range. At low temperatures, e.g. —78° C., isobutylene will give polymers in or above the $C_{20}$–$C_{60}$ range. However, propylene will not give $C_{20}$–$C_{60}$ polymers under either of these conditions; dimers and trimers are mainly formed, if any polymerization does occur.

It is also known that the activity of boron trifluoride may be increased by adding water or a hydrogen halide, but even here the $C_{20}$–$C_{60}$ polymers are usually obtained, if at all, only at very low temperatures. Moreover, the addition of water or acid creates a highly corrosive system, complicates the product recovery and catalyst recycle, and may result in the chemical addition of halogen to the polymer. By the present method, the desired polymer is obtained at low pressures in a non-corrosive, liquid system, and product recovery and catalyst recycle are very simple. Moreover, the product is free from halogen. These constitute the main objectives of the process, though others will be apparent from the description which follows:

The preformed polymer used as seed may be derived from any lower aliphatic olefin ($C_2$–$C_8$), e.g. ethylene, propylene, butene-1, isobutylene, pentene-1, hexene-1, etc. Its molecular weight should be above that desired for the final propylene polymer, i.e. above about 800, and preferably above 5,000. Polymers formed in situ, as e.g. by adding traces of monomeric isobutylene to the liquid propylene, are not as effective as preformed polymer, presumably because the seed polymer formed from dilute solution in situ is not of sufficiently high molecular weight. Operative amounts of seed polymer range from infinitesimal traces up to about 5% by weight of propylene used. It is generally preferred to use between about 0.01% to 1.0%, but any amount which will increase the yield of desired polymer over that obtainable in its absence is contemplated.

Best results are obtained when the seed polymer is dissolved in the reaction mixture; completely undissolved polymer has little or no effect. The polymerization is best carried out in an inert solvent, e.g. propane, butane, pentane, hexane, benzene, toluene, methyl chloride, ethyl chloride, methylene dichloride, carbon tetrachloride, and the like. A solvent is not essential however where the seed polymer is sufficiently soluble in liquid propylene.

Operative temperatures range between about —150° and 0° C., preferably between about —100° and —20° C. At higher temperatures the proportion of $C_{20}$–$C_{60}$ polymer formed is too low, dimers and trimers predominating. At lower temperatures the reaction is too slow. It is preferred to use atmospheric pressures or thereabouts, but higher pressures, up to about 500 p.s.i.g., may be employed if desired.

The following examples are cited to illustrate the process, but are not intended to be limiting in scope:

Example I

About 1200 ml. of liquid methyl chloride was placed in a 5 liter flask. Into this methyl chloride was condensed at —78° C., 1,000 gms. of propylene. With stirring at —78° C., $BF_3$ gas was slowly bubbled through the solution for 2½ hours. The reaction mixture was then allowed to warm up to about —30° C., and was slowly poured into 3½ liters of methanol. The product was completely miscible; no polymer precipitated. This shows that in the absence of a polymer seed, the desired polymerization does not take place, i.e. no high-molecular-weight polymer is formed.

Example II

In a similar experiment, 1200 ml. of methyl chloride was again placed in the 5 liter flask. To this was added, with stirring, 1 gm. of polyisobutylene of molecular weight about 20,000, dissolved in 30 ml. of iso-octane. About 1500 ml. of propylene was then condensed into the solution at —78° C., and $BF_3$ was added slowly with stirring at —78° C. for 2½ hours. The mixture was then allowed to warm slightly, and was poured into 3½ liters of methanol. A heavy oil settled out, and was separated, and heated on the steam bath to remove solvent. About 700 ml. of liquid polymer remained, which was found to have a bromine number of 25.3, indicating an average molecular weight of about 600. The kinematic viscosity at 100° F. was 104.7 centistokes, and at 210° F. it was 9.3 centistokes. The pour point was —30° F.

This example shows that the presence of less than 0.1% of seed polymer gives good yields of an oil having lubricating qualities. Hydrogenation of the oil over Raney nickel gave a substantial improvement in color and viscosity index.

Example III

Example II was repeated, using 200 gms. of propylene in 200 ml. of ethyl chloride solvent, in which was dissolved 1.0 gm. of the polyisobutylene in 30 ml. of heptane. About 160 gms. of methanol-insoluble oil was recovered.

Example IV

A solution of 200 gm. of propylene in 200 ml. of ethyl chloride was prepared, and to this was added 1 gm. of non-isotactic polypropylene dissolved in 50 ml. of iso-octane. The polypropylene was an ether-soluble fraction of a solid polymer prepared by polymerizing propylene in the presence of a "Ziegler-type" catalyst, i.e. aluminum triethyl plus titanium tetrachloride. Its molecular weight was in excess of 20,000.

Gaseous $BF_3$ was then bubbled through the mixture for 2½ hours at —78° C., with stirring. Upon pouring the product into 2 liters of methanol, 195 gms. of viscous oil separated and was recovered. Its properties were similar to the product of Example II. This example shows that the higher molecular weight seed polymers give even higher yields of the desired polypropylene.

Example V

The procedure of Example IV was repeated, using instead of the seed polymer, 2 ml. of monomeric isobutylene. Only 75 gms. of oil separated from the methanol solution. This shows that seed polymers prepared in situ are not nearly as effective as preformed polymers having a molecular weight in excess of that desired for the polypropylene to be produced.

Example VI

Into 50 ml. of ethyl chloride was condensed 200 gms. of propylene. To this solution was added 19 gms. of the ether-insoluble, Ziegler type polypropylene dissolved in 400 ml. of toluene. Upon cooling the resulting solution, the seed polymer precipitated from solution before the reaction temperature of —78° C was reached. At —78° C., $BF_3$ was bubbled through the slurry for 2½ hours. Upon pouring the product into 2 liters of methanol, no insoluble oil layer was formed, showing that undissolved seed polymer is ineffective.

When other solvents and other seed polymers within the scope of this disclosure are substituted in the foregoing Examples II to IV, substantially the same results are obtained. The true scope of the invention is intended to be defined by the following claims.

I claim:

1. A method for producing a propylene polymer which comprises contacting liquid propylene with a catalyst consisting essentially of dry boron trifluoride at a temperature between about —150° and 0° C., in the presence of a small amount, less than about 5% by weight of the propylene, of a dissolved, preformed olefin polymer having a molecular weight in excess of about 5,000.

2. A process as defined in claim 1 wherein said preformed polymer is polypropylene.

3. A process as defined in claim 1 wherein said preformed polymer is polyisobutylene.

4. A method for producing a propylene polymer in the $C_{20}$–$C_{60}$ range, which comprises contacting liquid propylene with a catalyst consisting essentially of dry boron trifluoride at a temperature between about —150° and 0° C., in the presence of an inert solvent and a small amount, less than about 5% by weight of the propylene, of a dissolved, preformed polymer of a $C_2$–$C_8$ olefin, said preformed polymer having a molecular weight in excess of about 5,000.

5. A process as defined in claim 4 wherein said preformed polymer is polypropylene.

6. A process as defined in claim 4 wherein said preformed polymer is polyisobutylene.

7. A process as defined in claim 4 wherein said solvent is a chlorinated lower alkane, containing no more than 2 carbon atoms.

References Cited in the file of this patent

UNITED STATES PATENTS

| | | |
|---|---|---|
| 2,085,524 | De Simo et al. | June 29, 1937 |
| 2,315,080 | Reid | Mar. 30, 1943 |
| 2,401,933 | Hersberger | June 11, 1946 |
| 2,587,562 | Wilson | Feb. 26, 1952 |

FOREIGN PATENTS

| | | |
|---|---|---|
| 627,265 | Great Britain | Nov. 16, 1945 |